United States Patent
Yuk et al.

(10) Patent No.: US 10,404,432 B2
(45) Date of Patent: Sep. 3, 2019

(54) METHODS AND APPARATUSES FOR PHYSICAL RESOURCE BLOCK BUNDLING SIZE CONFIGURATION

(71) Applicant: NOKIA TECHNOLOGIES OY, Espoo (FI)

(72) Inventors: Youngsoo Yuk, Seoul (KR); Ankit Bhamri, Helsinki (FI); Mihai Enescu, Espoo (FI); Juha Pekka Karjalainen, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 62 days.

(21) Appl. No.: 15/586,946

(22) Filed: May 4, 2017

(65) Prior Publication Data
US 2018/0324760 A1 Nov. 8, 2018

(51) Int. Cl.
H04L 5/00 (2006.01)
H04L 1/00 (2006.01)
H04W 88/02 (2009.01)

(52) U.S. Cl.
CPC .............. *H04L 5/0048* (2013.01); *H04L 1/00* (2013.01); *H04L 5/0044* (2013.01); *H04L 5/0053* (2013.01); *H04L 5/0051* (2013.01); *H04L 5/0092* (2013.01); *H04W 88/02* (2013.01)

(58) Field of Classification Search
CPC ............. H04W 72/02; H04W 72/0446; H04W 72/042; H04W 88/02; H04L 5/0048
See application file for complete search history.

(56) References Cited

U.S. PATENT DOCUMENTS

| | | | |
|---|---|---|---|
| 2013/0077560 A1* | 3/2013 | Horiuchi | H04W 72/044 370/315 |
| 2015/0146658 A1* | 5/2015 | Liu | H04L 5/0053 370/329 |
| 2015/0207550 A1* | 7/2015 | Lee, II | H04L 1/0041 375/267 |
| 2015/0223216 A1* | 8/2015 | Han | H04W 72/044 370/329 |
| 2015/0365145 A1* | 12/2015 | Schober | H04B 7/0417 375/267 |
| 2016/0087774 A1* | 3/2016 | Guo | H04L 5/0051 370/329 |
| 2016/0227520 A1* | 8/2016 | Davydov | H04L 25/0228 |

\* cited by examiner

*Primary Examiner* — Andrew Lai
*Assistant Examiner* — Chuong M Nguyen
(74) *Attorney, Agent, or Firm* — Squire Patton Boggs (US) LLP

(57) ABSTRACT

Systems, methods, apparatuses, and computer program products relating to physical resource block (PRB) bundling size and/or precoding resource block group (PRG) configuration are provided. One method may include determining a minimum PRG size based at least on a user equipment's operating bandwidth, defining a configurable PRG set based on the minimum PRG size, and signaling the PRG set to the user equipment.

19 Claims, 3 Drawing Sheets

METHODS AND APPARATUSES FOR PHYSICAL RESOURCE BLOCK BUNDLING SIZE CONFIGURATION

BACKGROUND

Field

Embodiments of the invention generally relate to wireless or mobile communications networks, such as, but not limited to, the Universal Mobile Telecommunications System (UMTS) Terrestrial Radio Access Network (UTRAN), Long Term Evolution (LTE) Evolved UTRAN (E-UTRAN), LTE-Advanced (LTE-A), LTE-A Pro, and/or 5G radio access technology or new radio access technology (NR). Some embodiments may generally relate to physical resource block (PRB) bundling size and/or precoder resource block group (PRG) configuration.

Description of the Related Art

Universal Mobile Telecommunications System (UMTS) Terrestrial Radio Access Network (UTRAN) refers to a communications network including base stations, or Node Bs, and for example radio network controllers (RNC). UTRAN allows for connectivity between the user equipment (UE) and the core network. The RNC provides control functionalities for one or more Node Bs. The RNC and its corresponding Node Bs are called the Radio Network Subsystem (RNS). In case of E-UTRAN (enhanced UTRAN), no RNC exists and radio access functionality is provided by an evolved Node B (eNodeB or eNB) or many eNBs. Multiple eNBs are involved for a single UE connection, for example, in case of Coordinated Multipoint Transmission (CoMP) and in dual connectivity.

Long Term Evolution (LTE) or E-UTRAN refers to improvements of the UMTS through improved efficiency and services, lower costs, and use of new spectrum opportunities. In particular, LTE is a 3GPP standard that provides for uplink peak rates of at least, for example, 75 megabits per second (Mbps) per carrier and downlink peak rates of at least, for example, 300 Mbps per carrier. LTE supports scalable carrier bandwidths from 20 MHz down to 1.4 MHz and supports both Frequency Division Duplexing (FDD) and Time Division Duplexing (TDD).

As mentioned above, LTE may also improve spectral efficiency in networks, allowing carriers to provide more data and voice services over a given bandwidth. Therefore, LTE is designed to fulfill the needs for high-speed data and media transport in addition to high capacity voice support. Advantages of LTE include, for example, high throughput, low latency, FDD and TDD support in the same platform, an improved end-user experience, and a simple architecture resulting in low operating costs.

Certain releases of 3GPP LTE (e.g., LTE Rel-10, LTE Rel-11, LTE Rel-12, LTE Rel-13) are targeted towards international mobile telecommunications advanced (IMT-A) systems, referred to herein for convenience simply as LTE-Advanced (LTE-A).

LTE-A is directed toward extending and optimizing the 3GPP LTE radio access technologies. A goal of LTE-A is to provide significantly enhanced services by means of higher data rates and lower latency with reduced cost. LTE-A is a more optimized radio system fulfilling the international telecommunication union-radio (ITU-R) requirements for IMT-Advanced while maintaining backward compatibility. One of the key features of LTE-A, introduced in LTE Rel-10, is carrier aggregation, which allows for increasing the data rates through aggregation of two or more LTE carriers.

$5^{th}$ generation (5G) or new radio (NR) wireless systems refer to the next generation (NG) of radio systems and network architecture. 5G is expected to provide higher bitrates and coverage than the current LTE systems. It is estimated that 5G will provide bitrates one hundred times higher than LTE offers (e.g., on the order of 10-20 Gbit/s). 5G will support at least enhanced mobile broadband (eMBB) and ultra-reliable low-latency-communication (URLLC). 5G is also expected to increase network expandability up to hundreds of thousands of connections. The signal technology of 5G is anticipated to be improved for greater coverage as well as spectral and signaling efficiency. 5G is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. In 5G or NR, the node B or eNB may be referred to as a next generation node B (gNB).

SUMMARY

One embodiment is directed to a method that may include determining a minimum precoding resource block group (PRG) size based at least on a user equipment's operating bandwidth, defining a configurable precoding resource block group (PRG) set based on the minimum precoding resource block group (PRG) size, and signaling the precoding resource block group (PRG) set to the user equipment.

Another embodiment is directed to an apparatus that may include at least one processor and at least one memory including computer program code. The at least one memory and the computer program code are configured, with the at least one processor, to cause the apparatus at least to determine a minimum precoding resource block group (PRG) size based at least on a user equipment's operating bandwidth, define a configurable precoding resource block group (PRG) set based on the minimum precoding resource block group (PRG) size, and signal the precoding resource block group (PRG) set to the user equipment.

Another embodiment is directed to a computer program, embodied on a non-transitory computer readable medium. The computer program is configured to control a processor to perform a process that may include determining a minimum precoding resource block group (PRG) size based at least on a user equipment's operating bandwidth, defining a configurable precoding resource block group (PRG) set based on the minimum precoding resource block group (PRG) size, and signaling the precoding resource block group (PRG) set to the user equipment.

Another embodiment is directed to an apparatus that may include determining means for determining a minimum precoding resource block group (PRG) size based at least on a user equipment's operating bandwidth, defining means for defining a configurable precoding resource block group (PRG) set based on the minimum precoding resource block group (PRG) size, and signaling means for signaling the precoding resource block group (PRG) set to the user equipment.

BRIEF DESCRIPTION OF THE DRAWINGS

For proper understanding of the invention, reference should be made to the accompanying drawings, wherein.

DETAILED DESCRIPTION

Figure 1:
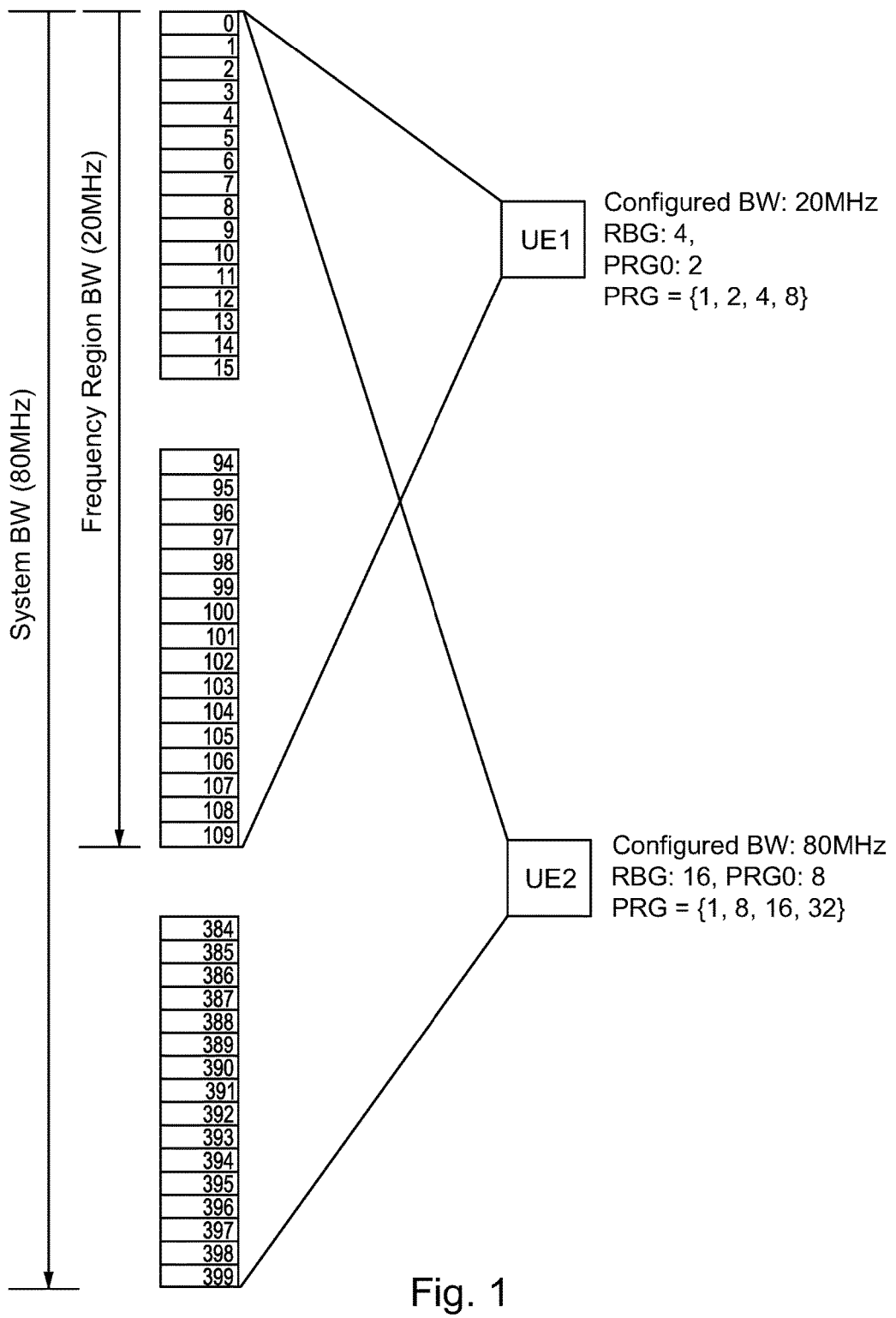
FIG. 1 illustrates an example of a system, according to one embodiment.

It will be readily understood that the components of the invention, as generally described and illustrated in the figures herein, may be arranged and designed in a wide variety of different configurations. Thus, the following detailed description of the embodiments of systems, methods, apparatuses, and computer program products relating to physical resource block (PRB) bundling size and/or precoding resource block group (PRG) configuration, as represented in the attached figures and described below, is not intended to limit the scope of the invention but is representative of selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Additionally, if desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

3GPP has made certain agreements on the PRB bundling size. For example, for the DL, NR is expected to support configurable PRG size for data demodulation reference signal (DMRS). The signaling for the configuration of PRG size, and whether it is semi-static or dynamic, as well as the available options/schemes is yet to be determined. Additionally, continuous precoding in time domain for DMRS channel estimation may be supported including, for example: semi-static measurement window, dynamic indication of precoding sets, support of continuous precoding when gNB supports slot aggregation, and contiguous time allocations. Furthermore, the multiplexing of DMRS ports using time domain OCC between aggregated slots may be supported, taking into account the impact of DMRS pattern and other code is not precluded.

For discrete Fourier transform spread orthogonal frequency division multiplexing (DFT-S-OFDM) based transmission, PRB bundling size should be the whole scheduled bandwidth if the scheduled bandwidth comprises a single cluster. It is noted that a UE may apply the precoder in a way that the gNB may assume that UE uses the same precoder for all scheduled PRBs. It has yet to be determined whether the multi cluster case is supported. For cyclic prefix (CP)-OFDM based transmission, for codebook based, PRB bundling should be supported.

Configurability of PRB bundling size and/or PRB bundling size implicit determination may be supported, and the applicability to some non-codebook based cases is to be determined. For CP-OFDM based transmission that is non-codebook based, PRB Bundling should be supported. However, it remains to be seen regarding the configurability by gNB side, for example, PRB bundling on or off and/or PRB bundling size.

For PRB bundling of data channel, there should be support for common design for PRB bundling for different scenarios, e.g., radio channel reciprocal or non-reciprocal, different transmitter (Tx)/receiver (Rx) beamforming, etc. Also, for PRB bundling of data channel, a common PRB bundling size set for all scenarios should be specified and a common indication procedure for all scenarios should be specified; however, it is to be determined whether there are different PRB bundling size sets for different bandwidths (BWs).

In addition, according to certain embodiments, the following PRB bundling sizes may be considered: specified value(s) X (where it is to be determined what the value of X will be and whether more than one value is needed). It is aimed for a value aligned with resource allocation granularity. There should be contiguous allocated PRBs when at least Y contiguous PRBs are allocated, but the values of Y have thus far been yet to be determined. It is expected that scheduled BW dependent and values to be equal or larger than scheduled BW; however, it is yet to be determined how different transmission schemes may be related to different subsets of PRB bundling configurations. Other configurations are not precluded.

Further, in certain embodiments, it is expected there will be support for UE specific PRB bundling size indication. RRC may be configured with a subset, and/or downlink control information (DCI) dynamically indicated. DCI overhead should be considered; medium access control (MAC) control element (CE) can be considered if the number of subset elements is large. Also, the presence of DCI field related to PRB bundling may be configured by RRC. Implicit signaling to inform PRB bundling size can be considered. Additionally, UE feedback assisted PRB bundling size may also be considered.

In an embodiment of the present disclosure, an efficient approach for defining PRB bundling size and PRG configuration is provided.

PRG may be considered to be the minimum granularity of PRB groups precoded with the same precoding matrix. Based on the prior knowledge of PRG, in case of DMRS-based transparent transmission scheme, the receiver can perform demodulation per PRG. A smaller PRG may be good for exploiting frequency selective radio channel, while a larger PRG may provide enough radio channel estimation performance by increasing the number of reference signal REs to be used.

LTE only defines one PRG value for a specific channel bandwidth; however, a single PRG may not be an efficient approach, because optimal PRG size is determined based on the radio channel characteristic, received signal-to-noise ratio (SNR), scheduled bandwidth and DMRS pattern, etc. Thus, in NR, configurable PRG should be supported. In LTE, there is another value of RBG which is also a function of the system bandwidth. RBG is the minimum granularity of the resource allocation type 0 and 1. And, to avoid the misalignment between resource allocation and PRG, PRG may be defined as one of divisor of RBG.

Table 1 below illustrates type 0 resource allocation RBG size vs. downlink system bandwidth; while Table 2 below illustrates PRG size vs. downlink system bandwidth.

TABLE 1

| System Bandwidth $N_{RB}^{DL}$ | RBG Size (P) |
|---|---|
| ≤10 | 1 |
| 11-26 | 2 |
| 27-63 | 3 |
| 64-110 | 4 |

TABLE 2

| System Bandwidth ($N_{RB}^{DL}$) | PRG Size (P') (PRBs) |
|---|---|
| ≤10 | 1 |
| 11-26 | 2 |
| 27-63 | 3 |
| 64-110 | 2 |

Thus, for NR, an efficient method for flexible PRG configuration that fulfils at least the above-noted considerations may be desirable.

Certain embodiments provide an efficient method for providing a flexible configuration of PRG taking into consideration several design aspects. In one embodiment, a method may include defining or determining a minimum PRG size, PRG0, as a function of at least UE's operating bandwidth, defining configurable PRG set based on the defined minimum PRG size, and signaling the dynamic configuration.

According to an embodiment, PRG0 may be defined as a minimum PRG size and the size may be determined at least as a function of UE's operating bandwidth. In order not to generate any boundary issues, PRG0 may be aligned with RBG either in integer multiples of RBG or integer divisors of RBG. In NR, different from LTE, UE specific partial bandwidth operation for data allocation and feedback is to be supported. In this case, it is possible that a UE's operating bandwidth is smaller than the system bandwidth. As such, it may be possible for a UE's operating bandwidth to be configured with the whole system bandwidth. Then, PRG0 can be configured in a UE specific manner, according to the UE's capability.

FIG. 1 illustrates an example system, according to one embodiment. As illustrated in the example of FIG. 1, two UEs (UE1 and UE2) may have different configured bandwidths, e.g., 20 MHz and 80 MHz, respectively. PRG0 can be defined differently for each of UE1 and UE2 even though they are communicating on the same carrier. Therefore, FIG. 1 illustrates an example of UE-specific configuration of PRB bundling size (PRG). In this example, according to the UE's configured bandwidth (BW), the PRB bundling sizes may be differently configured. This makes it possible to reduce the signalling overhead for feedback by using a larger PRG0 with a larger configured bandwidth.

In addition, NR supports different subcarrier spacing for multiple usage, which means that one PRB can span different frequency bandwidth according to its subcarrier spacing.

There are at least two main scenarios for using larger subcarrier spacing. One scenario is larger bandwidth support with low delay radio channel, and the other scenario is to support low latency service. Thus, at least in the latter case, assuming the same coherence bandwidth, the PRB bundling size to be aligned with the coherence bandwidth can be reduced as the subcarrier spacing increases. In this case, it is possible that the different PRG0 sizes are defined for different subcarrier spacing as shown in Table 3 below. In particular, Table 3 illustrates an example of PRB bundling size configurations for different subcarrier spacing.

TABLE 3

| | | PRG0 | | |
|---|---|---|---|---|
| $N_{RB}^{DL}$ | RBG | f0 = 15 kHz | f0 = 30 kHz | f0 = 60 kHz |
| ≤26 | 2 | 2 | 1 | 1 |
| 64-110 | 4 | 2 | 2 | 1 |
| 111-220 | 8 | 4 | 2 | 2 |
| 221-439 | 16 | 8 | 4 | 2 |

For efficient signalling, a default PRG0 may be predefined in the specification. However, it is also possible for the default PRG0 to be overridden by higher-layer signalling, i.e., RRC configuration.

Accordingly, certain embodiments may introduce PRG0 which is a unit of PRG configuration, and that can be different for UE's operating bandwidth or subcarrier spacing.

In one embodiment, for flexible configuration of PRG, a PRG set may be defined. PRG (PRB bundling size) may depend on the radio channel characteristic and can be determined by simulations at link-level and system-level. For example, for frequency flat radio channel, a larger bundling size can provide better performance in terms of radio channel estimation. In another example, in case of frequency selective radio channel and open loop PRB-based precoder cycling scheme, a small PRB bundling size, e.g., one PRB may be better than a larger size.

Thus, according to an embodiment, PRB bundling size may be defined according to radio channel condition and transmission schemes. To achieve both low signalling overhead and the radio channel estimation performance, the following mapping can be used. For instance, the values in the PRG set may be chosen from among one PRB or multiples of PRG0, such as PRG set={1, PRG0, 2×PRG0, 3×PRG0, 4×PRG0, . . . }. In some embodiments, between 2 to 4 values may be configured. In addition, it is noted that, if PRB bundling size is not aligned with PRG0 size, there may be some boundary problems at the edge of allocation; that is, less PRB bundling size should be applied at the edge, and can cause the performance imbalance among PRGs within one scheduled bandwidth.

Similar to PRG0, a PRG set can be UE-specifically configured. Because UE's capability and the usage scenario may be different (e.g., mobile terminal, nomadic/fixed terminal, or high speed train, etc.), a PRG set can be differently defined. In some embodiments, the PRG set can be signalled via higher layer signalling, such as RRC configuration or SIB (default set).

Accordingly, in certain embodiments, a PRG set may be formed with values of one PRG0 and/or multiples of PRG0. In addition, in some embodiments, the PRG set may be defined in a UE-specific manner.

In certain embodiments, the signalling of PRB bundling size can be carried out explicitly via DCI, or via a semi-static manner. By using DCI, for example 2 bits may be used, leading to PRB bundling size to be one of elements in the set, i.e., {1, PRG0, 2×PRG0, 3×PRG0}. Other embodiments may make a linkage between PRB bundling size and DMRS patterns. An optimal PRB bundling size may be related to the number of DMRS resource elements (Res) to be used in a radio channel estimation. If a DMRS pattern has many DMRS REs for frequency selective radio channel, then with the relation of this frequency domain DMRS density, smaller PRB bundling size can be assumed by UE as default configuration.

Otherwise, where the number of DMRS REs in a PRB is large enough, larger PRB bundling size can be assumed by UE. For example, assuming that at least 24 REs are required for better radio channel estimation, and 3 REs are available in a PRB, then 8 PRB may be a good candidate for PRB bundling size. If PRG0 is 2, then 4×PRG0(=8 PRB) may be the PRB bundling size, and, if PRG0 is 3, then also 3×PRG0 (=9 PRB) may be the bundling size. Also, if one DMRS configuration assigns 6 REs in a PRB, then 4 PRB is a possible PRB bundling size. In this case, (PRG0, PRB bundling size)=(2, 2×PRG0), (3, 2×PRG0) or (4, PRG0) respectively.

Based on this relationship, in one embodiment, PRB bundling size may be calculated implicitly as a function of DMRS configurations. Similarly, certain embodiments may consider signaling for PRB bundling size inside DMRS configuration. It is expected there will be support for multiple DMRS configurations for multiple scenarios to be configured dynamically. In this case, PRB bundling size may be included as one parameter of DMRS configurations. Even in this case, PRB bundling size can be defined as a function of PRG0.

Accordingly, in certain embodiments, PRG may be defined as a function of DMRS patterns (e.g., DMRS frequency domain density) or PRG may be explicitly signalled with DMRS configuration.

In view of the above, certain embodiments provide an efficient method to define PRB bundling size. In an embodiment, to be aligned with the Cell/UE specific-bandwidth and different numerology option, PRG0 may be defined as a fixed value. According to one embodiment, based on the PRG0, PRB bundling size can be configured as multiples of PRG0. However, to support some specific transmission scheme such as open-loop SFBC, precoder cycling, or the like, additionally one PRB can be included in the PRB bundling size set. In an embodiment, the PRG0 and the whole PRB bundling size set may be configured as UE-specific, or may be defined in a specification. The PRB bundling size may be dynamically signalled explicitly or may be signalled implicitly with the relation with DMRS configuration. Thus, embodiments may provide an efficient method for signaling PRB bundling size for various system configurations (e.g., UE-specific BW, subcarrier spacing and radio channel characteristics) without introducing a complex configuration mechanism.

Figure 2A:
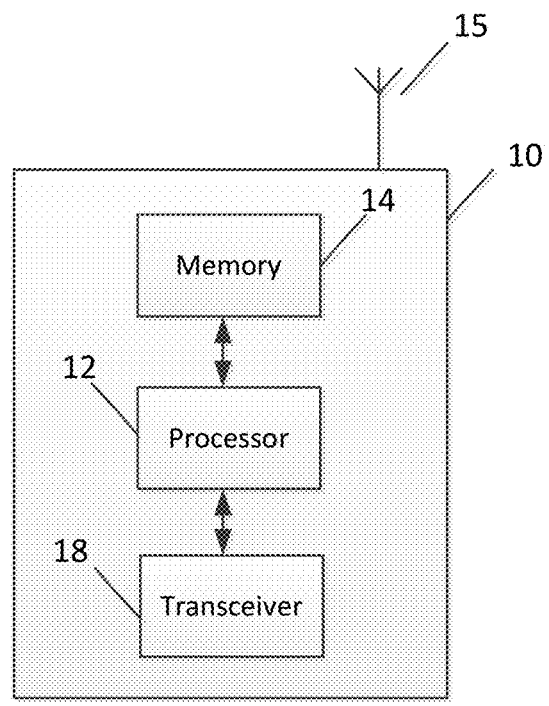
FIG. 2a illustrates an example block diagram of an apparatus, according to an embodiment.

FIG. 2a illustrates an example of an apparatus 10 according to an embodiment. In an embodiment, apparatus 10 may be a node, host, or server in a communications network or serving such a network. For example, apparatus 10 may be a base station, a node B, an evolved node B, 5G node B or access point, next generation node B (NG-NB or gNB), WLAN access point, mobility management entity (MME), or subscription server associated with a radio access network, such as a GSM network, LTE network, 5G or NR.

It should be understood that apparatus 10 may be comprised of an edge cloud server as a distributed computing system where the server and the radio node may be stand-alone apparatuses communicating with each other via a radio path or via a wired connection, or they may be located in a same entity communicating via a wired connection. It should be noted that one of ordinary skill in the art would understand that apparatus 10 may include components or features not shown in FIG. 2a.

As illustrated in FIG. 2a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 2a, multiple processors may be utilized according to other embodiments. For example, it should be understood that, in certain embodiments, apparatus 10 may include two or more processors that may form a multiprocessor system (i.e., in this case processor 12 represents a multiprocessor) that may support multiprocessing. In certain embodiments, the multiprocessor system may be tightly coupled or loosely coupled (e.g., to form a computer cluster).

Processor 12 may perform functions associated with the operation of apparatus 10 which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink). As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly.

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

In certain embodiments, apparatus 10 may be a network node or RAN node, such as a base station, access point, node B, eNB, 5G or new radio node B (gNB) or access point, WLAN access point, or the like. According to certain embodiments, apparatus 10 may be controlled by memory 14 and processor 12 to perform the functions associated with any of the embodiments described herein. In one embodiment, apparatus 10 may be controlled by memory 14 and processor 12 to define or determine a minimum PRG size (PRG0) based at least on a UE's operating bandwidth. In this embodiment, PRG0 may be aligned with RBG either in integer multiples of RBG or integer divisors of RBG. As such, apparatus 10 may be controlled by memory 14 and processor 12 to define the PRG0 in a UE specific manner, according to the UE's capability. For example, where two (or more) UEs have different configured bandwidths, apparatus 10 may be controlled by memory 14 and processor 12 to define the PRG0 differently for each of the UEs even if they are communicating on the same carrier. This can result in a reduction of the signalling overhead for feedback by using a larger PRG0 with a larger configured bandwidth.

According to certain embodiments, the PRB bundling size to be aligned with the coherence bandwidth can be reduced as the subcarrier spacing increases. In this case, apparatus 10 may be controlled by memory 14 and processor 12 to define different PRG0 sizes for different subcarrier spacing.

In an embodiment, apparatus 10 may be further controlled by memory 14 and processor 12 to define a PRG set. According to one embodiment, PRG (PRB bundling size) may depend on the radio channel characteristic and may be determined by simulations at link-level and system-level. In some embodiments, a larger bundling size may provide better performance in terms of radio channel estimation; but in other embodiments a small PRB bundling size (e.g., one PRB) may provide better performance than a larger size.

Thus, according to an embodiment, apparatus 10 may be controlled by memory 14 and processor 12 to define PRB bundling size according to a radio channel condition and transmission schemes. In one embodiment, the values in the PRG set may be chosen, for example, from among one PRB or multiples of PRG0, such as PRG set={1, PRG0, 2×PRG0, 3×PRG0, 4×PRG0, . . . }. In some embodiments, between 2 to 4 values may be configured. In some embodiments, similar to PRG0, the PRG set may be UE-specifically configured. For example, because UE's capability and the usage scenario may be different, a PRG set can be defined differently for each UE. In some embodiments, apparatus 10 may be controlled by memory 14 and processor 12 to signal the PRG set via higher layer signalling, such as RRC configuration or SIB (default set).

In some embodiments, apparatus 10 may be controlled by memory 14 and processor 12 to signal the PRB bundling size (or PRG) explicitly via DCI, or via a semi-static manner. When using DCI, 2 bits may be used for example, leading to PRB bundling size to be one of the elements in the set, i.e., {1, PRG0, 2×PRG0, 3×PRG0}. Other embodiments may provide a linkage between PRB bundling size and DMRS patterns. In this embodiment, an optimal PRB bundling size may be related to the number of DMRS resource elements (REs) to be used in a radio channel estimation.

If a DMRS pattern has many DMRS REs for frequency selective radio channel, then with the relation of this frequency domain DMRS density, smaller PRB bundling size can be assumed by UE as default configuration. Otherwise, where DMRS REs in a PRB is large enough, larger PRB bundling size can be assumed by UE. For example, assuming that at least 24 REs are required for better radio channel estimation, and 3 REs are available in a PRB, then 8 PRB may be a good candidate for PRB bundling size. If PRG0 is 2, then 4×PRG0(=8 PRB) may be the PRB bundling size, and, if PRG0 is 3, then also 3×PRG0 (=9 PRB) may be the bundling size. Also, if one DMRS configuration assigns 6 REs in a PRB, then 4 PRB is a possible PRB bundling size. In this case, (PRG0, PRB bundling size)=(2, 2×PRG0), (3, 2×PRG0) or (4, PRG0) respectively.

Based on this relationship, in one embodiment, apparatus 10 may be controlled by memory 14 and processor 12 to calculate the PRB bundling size implicitly as a function of DMRS configurations. Similarly, in certain embodiments, apparatus 10 may be controlled by memory 14 and processor 12 to signal for PRB bundling size inside DMRS configuration. In another embodiment, apparatus 10 may be controlled by memory 14 and processor 12 to include PRB bundling size as one parameter of DMRS configurations.

Figure 2B:
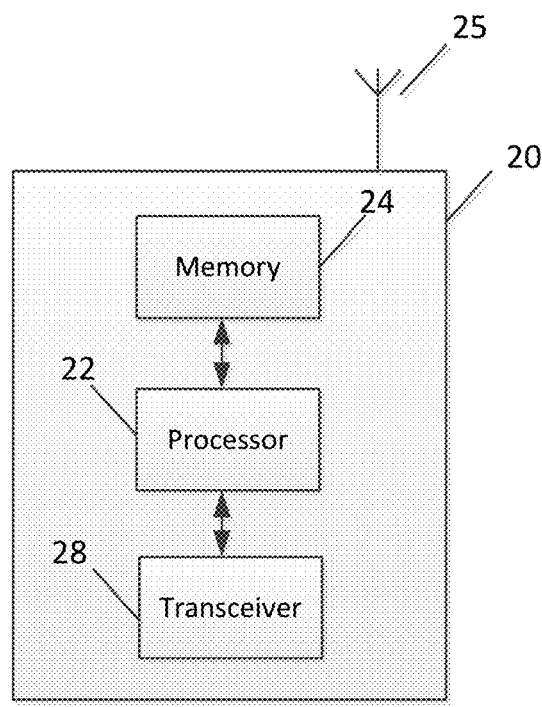
FIG. 2b illustrates an example block diagram of an apparatus, according to another embodiment.

FIG. 2b illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, UE may alternatively be referred to as, for example, a mobile station, mobile equipment, mobile unit, mobile device, user device, subscriber station, wireless terminal, tablet, smart phone, IoT device or NB-IoT device, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, and the like), one or more radio access components (for example, a modem, a transceiver, and the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, and any other radio access technologies. It should be noted that one of ordinary skill in the art would understand that apparatus 20 may include components or features not shown in FIG. 2b.

As illustrated in FIG. 2b, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 2b, multiple processors may be utilized according to other embodiments. For example, it should be understood that, in certain embodiments, apparatus 20 may include two or more processors that may form a multiprocessor system (i.e., in this case processor 22 represents a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, without limitation, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 24 can be comprised of any combination of random access memory (RAM), read only memory (ROM), static storage such as a magnetic or optical disk, or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

According to one embodiment, apparatus 20 may be a UE, mobile device, mobile station, ME, IoT device and/or NB-IoT device, for example. According to certain embodiments, apparatus 20 may be controlled by memory 24 and processor 22 to perform the functions associated with embodiments described herein. For example, in some embodiments, apparatus 20 may be configured to perform one or more of the processes depicted in any of the flow charts or signaling diagrams described herein.

According to one embodiment, apparatus 20 may be controlled by memory 24 and processor 22 to receive an indication of PRB bundling size (or PRG). In an embodiment, the PRB bundling size may be defined based on a minimum PRG size. For example, the PRB bundling size may be defined as multiples of the minimum PRG size. In an embodiment, the PRB bundling size may be defined specifically for apparatus 20, for example, based on the operating bandwidth of apparatus 20. In certain embodiments, apparatus 20 may be controlled by memory 24 and processor 22 to receive the PRB bundling size explicitly via dynamic signaling or implicitly via relation with DMRS configuration, for example. In an embodiment, apparatus 20 may be controlled by memory 24 and processor 22 to apply the received PRB bundling size.

Figure 3A:
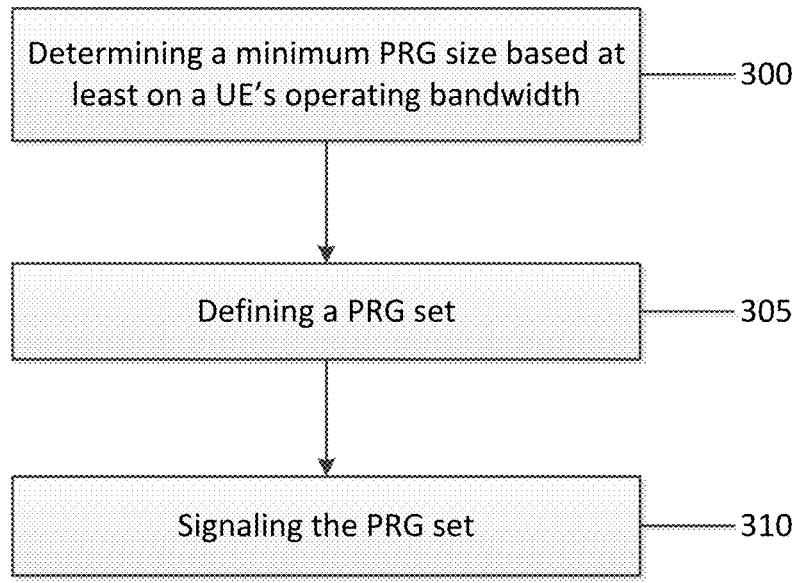
FIG. 3a illustrates an example flow chart of a process, according to an embodiment.

FIG. 3a illustrates an example flow diagram of a method, according to one embodiment. The method of FIG. 3a may be performed, for example, by a network node, such as a base station, access point, eNB, gNB, or the like. As illustrated in FIG. 3a the method may include, at 300, defining or determining a minimum PRG size (PRG0) based at least on a UE's operating bandwidth. The defining of the minimum PRG size may include defining the minimum PRG size in a UE specific manner, according to the UE's capability. For example, where two (or more) UEs have different configured bandwidths, the minimum PRG size may be defined differently for each of the UEs even if they are communicating on the same carrier. According to certain embodiments, the PRB bundling size to be aligned with the coherence bandwidth can be reduced as the subcarrier spacing increases. In this case, the defining of the minimum PRG size may include defining different minimum PRG sizes for different subcarrier spacing.

In an embodiment, the method may further include, at 305, defining a PRG set (i.e., PRB bundling size). According to one embodiment, the defining of the PRG set (i.e., PRB bundling size) may include defining the PRG set depending on the radio channel characteristic and/or determined by simulations at link-level and system-level. Thus, according to an embodiment, the defining of the PRG set (i.e., PRB bundling size) comprises defining the PRG set according to a radio channel condition and transmission schemes. In one embodiment, the defining of the PRG set may include selecting the values in the PRG set, for example, from among one PRB or multiples of PRG0, such as PRG set={1, PRG0, 2×PRG0, 3×PRG0, 4×PRG0, ... }. In some embodiments, between 2 to 4 values may be configured. In certain embodiments, similar to PRG0, the PRG set may be UE-specifically configured. For example, because UE's capability and the usage scenario may be different, a PRG set can be defined differently for each UE.

In some embodiments, the method may further include, at 310, signaling the PRG set (or PRB bundling size), for example, via higher layer signalling, such as RRC configuration or SIB (default set). In some embodiments, the signaling may include signaling the PRB bundling size (or PRG) explicitly via DCI, or via a semi-static manner. When using DCI, 2 bits may be used for example, leading to PRB bundling size to be one of the elements in the set, i.e., {1, PRG0, 2×PRG0, 3×PRG0}. In other embodiments, the signaling may include providing a linkage between PRB bundling size (or PRG) and DMRS patterns. In this embodiment, an optimal PRB bundling size may be related to the number of DMRS resource elements (REs) to be used in a radio channel estimation. In one embodiment, the method may include calculating the PRB bundling size (or PRG) implicitly as a function of DMRS configurations. In certain embodiments, the signaling may include signaling the PRB bundling size (or PRG) inside a DMRS configuration. In another embodiment, the method may comprise including the PRB bundling size (or PRG) as one parameter of DMRS configurations.

Figure 3B:
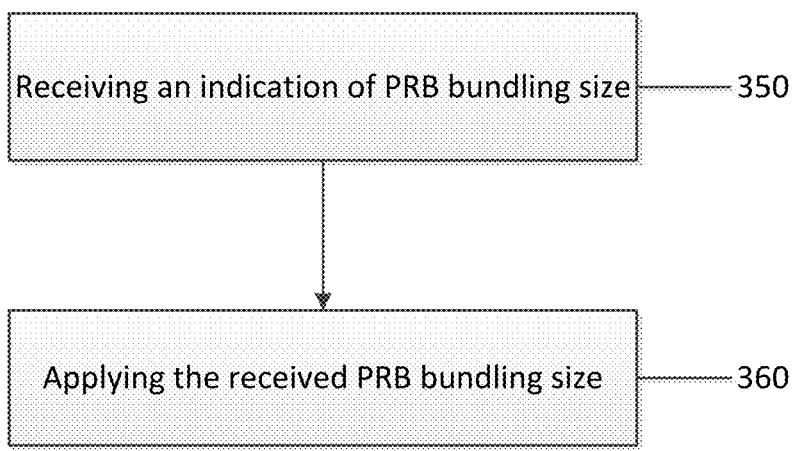
FIG. 3b illustrates an example flow chart of a process, according to another embodiment.

FIG. 3b illustrates an example flow diagram of a method, according to one embodiment. The method of FIG. 3b may be performed, for example, by a UE, mobile station, mobile device, IoT device, MTC device, or the like. As illustrated in FIG. 3b the method may include, at 350, receiving an indication of PRB bundling size (or PRG). In an embodiment, the PRB bundling size may be defined based on a minimum PRG size. For example, the PRB bundling size may be defined as multiples of the minimum PRG size. In an embodiment, the PRB bundling size may be defined specifically for the UE, for example, based on the operating bandwidth of the UE. In certain embodiments, the receiving may include receiving the PRB bundling size explicitly via dynamic signaling or implicitly via relation with DMRS configuration, for example. In an embodiment, the method may also include, at 360, applying the received PRB bundling size.

In view of the above, embodiments of the invention provide several technical effects and/or improvements and/or advantages. For example, certain embodiments provide an efficient method for signaling PRB bundling size for various system configuration (e.g., UE-specific bandwidth, subcarrier spacing and radio channel characteristics) without introducing a complex configuration mechanism. Thus, embodiments can, for example, improve performance and throughput of network nodes including, for example, base stations, eNBs, gNBs and/or UEs. Accordingly, the use of embodiments of the invention result in improved functioning of communications networks and their nodes.

In some embodiments, the functionality of any of the methods, processes, signaling diagrams, or flow charts described herein may be implemented by software and/or computer program code or portions of code stored in memory or other computer readable or tangible media, and executed by a processor.

In certain embodiments, an apparatus may be included or be associated with at least one software application, module, unit or entity configured as arithmetic operation(s), or as a program or portions of it (including an added or updated software routine), executed by at least one operation processor. Programs, also called computer program products or computer programs, including software routines, applets and macros, may be stored in any apparatus-readable data storage medium and include program instructions to perform particular tasks.

A computer program product may comprise one or more computer-executable components which, when the program is run, are configured to carry out embodiments described herein. The one or more computer-executable components may include at least one software code or portions of code. Modifications and configurations required for implementing the functionality of an embodiment may be performed as routine(s), which may be implemented as added or updated software routine(s). In some embodiments, software routine(s) may be downloaded into the apparatus.

Software or a computer program code or portions of code may be in a source code form, object code form, or in some intermediate form, and may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and/or software distribution package, for example. Depending on the processing power needed, the computer program may be executed in a single electronic digital device or it may be distributed amongst a number of devices or computers. The computer readable medium or computer readable storage medium may be a non-transitory medium.

In other embodiments, the functionality may be performed by hardware, for example through the use of an application specific integrated circuit (ASIC), a programmable gate array (PGA), a field programmable gate array (FPGA), or any other combination of hardware and software. In yet another embodiment, the functionality may be implemented as a signal, a non-tangible means that can be carried by an electromagnetic signal downloaded from the Internet or other network.

According to an embodiment, an apparatus, such as a node, device, or a corresponding component, may be configured as a computer or a microprocessor, such as single-chip computer element, or as a chipset, including at least a memory for providing storage capacity used for arithmetic operation(s) and an operation processor for executing the arithmetic operation.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method, comprising:
   determining a minimum precoding resource block group (PRG) size based at least on a user equipment's operating bandwidth;
   defining a configurable precoding resource block group (PRG) set based on the minimum precoding resource block group (PRG) size; and
   signaling the precoding resource block group (PRG) set to the user equipment.

2. The method according to claim 1, wherein the determining comprises determining the minimum precoding resource block group (PRG) size to be different for user equipment with different operating bandwidths.

3. The method according to claim 1, wherein the determining comprises determining the minimum precoding resource block group (PRG) size to be different for each subcarrier spacing.

4. The method according to claim 1, wherein the defining comprises forming the precoding resource block group (PRG) set with values of one and/or multiples of the minimum precoding resource block group (PRG) size.

5. The method according to claim 1, wherein the defining comprises defining the precoding resource block group (PRG) set to be user equipment (UE)-specific.

6. The method according to claim 1, wherein the signaling comprises signaling the precoding resource block group (PRG) set via downlink control information (DCI).

7. The method according to claim 1, wherein the signaling comprises signaling the precoding resource block group (PRG) set with demodulation reference signal (DMRS) configuration.

8. The method according to claim 1, wherein the defining of the precoding resource block group (PRG) set comprises calculating physical resource block (PRB) bundling size as a function of demodulation reference signal (DMRS) patterns.

9. The method according claim 1, wherein the defining of the precoding resource block group (PRG) set comprises defining the precoding resource block group (PRG) set according to radio channel conditions and/or transmission schemes.

10. An apparatus, comprising:
    at least one processor; and
    at least one memory including computer program code,
    the at least one memory and the computer program code are configured, with the at least one processor, to cause the apparatus at least to
    determine a minimum precoding resource block group (PRG) size based at least on a user equipment's operating bandwidth;
    define a configurable precoding resource block group (PRG) set based on the minimum precoding resource block group (PRG) size; and
    signal the precoding resource block group (PRG) set to the user equipment.

11. The apparatus according to claim 10, wherein the at least one memory and the computer program code are configured, with the at least one processor, to cause the apparatus at least to determine the minimum precoding resource block group (PRG) size to be different for user equipment with different operating bandwidths.

12. The apparatus according to claim 10, wherein the at least one memory and the computer program code are configured, with the at least one processor, to cause the apparatus at least to determine the minimum precoding resource block group (PRG) size to be different for each subcarrier spacing.

13. The apparatus according to claim 10, wherein the at least one memory and the computer program code are configured, with the at least one processor, to cause the apparatus at least to form the precoding resource block group (PRG) set with values of one and/or multiples of the minimum precoding resource block group (PRG) size.

14. The apparatus according to claim 10, wherein the at least one memory and the computer program code are configured, with the at least one processor, to cause the apparatus at least to define the precoding resource block group (PRG) set to be user equipment (UE)-specific.

15. The apparatus according to claim 10, wherein the at least one memory and the computer program code are configured, with the at least one processor, to cause the apparatus at least to signal the precoding resource block group (PRG) set via downlink control information (DCI).

16. The apparatus according to claim 10, wherein the at least one memory and the computer program code are configured, with the at least one processor, to cause the apparatus at least to signal the precoding resource block group (PRG) set with demodulation reference signal (DMRS) configuration.

17. The apparatus according to claim 10, wherein the at least one memory and the computer program code are configured, with the at least one processor, to cause the apparatus at least to define the precoding resource block group (PRG) set by calculating physical resource block (PRB) bundling size as a function of demodulation reference signal (DMRS) patterns.

18. The apparatus according claim 10, wherein the at least one memory and the computer program code are configured, with the at least one processor, to cause the apparatus at least to define the precoding resource block group (PRG) set according to radio channel conditions and/or transmission schemes.

19. A computer program, embodied on a non-transitory computer readable medium, wherein the computer program is configured to control a processor to perform a process, comprising:
    determining a minimum precoding resource block group (PRG) size based at least on a user equipment's operating bandwidth;
    defining a configurable precoding resource block group (PRG) set based on the minimum precoding resource block group (PRG) size; and
    signaling the precoding resource block group (PRG) set to the user equipment.

* * * * *